US012126003B2

(12) United States Patent
Song et al.

(10) Patent No.: US 12,126,003 B2
(45) Date of Patent: Oct. 22, 2024

(54) SYSTEM AND METHOD FOR FABRICATING ELECTRODE FILM FOR SECONDARY BATTERY

(71) Applicants: HYUNDAI MOTOR COMPANY, Seoul (KR); KIA CORPORATION, Seoul (KR)

(72) Inventors: Hannah Song, Ansan-si (KR); Sangwook Han, Ansan-si (KR); Kyeong Wi Park, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 253 days.

(21) Appl. No.: 17/524,241

(22) Filed: Nov. 11, 2021

(65) Prior Publication Data
US 2023/0028154 A1    Jan. 26, 2023

(30) Foreign Application Priority Data
Jul. 20, 2021    (KR) ........................ 10-2021-0094582

(51) Int. Cl.
*B05B 5/14*    (2006.01)
*B05D 1/00*    (2006.01)
(Continued)

(52) U.S. Cl.
CPC ............. *H01M 4/0435* (2013.01); *B05B 5/14* (2013.01); *B05D 1/007* (2013.01);
(Continued)

(58) Field of Classification Search
CPC ........... B05B 5/001; B05B 5/025; B05B 5/14; B05C 5/0245; B05C 5/025; B05C 5/027; B05C 5/0291; B05C 9/12; B05C 9/14; B05D 1/007; B05D 1/04; B05D 1/26; B05D 1/265; B29C 48/0011; B29C 48/0019; B29C 48/0021; B29C 48/022;
(Continued)

(56) References Cited

U.S. PATENT DOCUMENTS 11,271,212 B1 *    3/2022    Tiruvannamalai .. H01M 4/0404
2020/0152967 A1 *    5/2020    Duong ................. H01M 4/043

FOREIGN PATENT DOCUMENTS

KR    101861049 B1    3/2017
KR    101863518 B1    5/2018
(Continued)

*Primary Examiner* — Michael A Tolin
(74) *Attorney, Agent, or Firm* — MCDONNELL BOEHNEN HULBERT & BERGHOFF LLP

(57) ABSTRACT

A system for fabricating an electrode film for a secondary battery includes a powder film fabrication unit configured to form mixture powder with active material powder, binder powder, and conductive material powder, and fabricating a powder film roll by fibrillating the mixture powder, a base material film fabrication unit configured to form a mixture solution with carbon-based powder, the binder powder, and organic solvent, and form a base material film roll by patterning the mixture solution on a base material film, and an electrode film fabrication unit configured to dispose the base material film roll between two powder film rolls, and form an electrode film roll by overlapping and bonding the powder film and the base material film.

13 Claims, 7 Drawing Sheets

(51) Int. Cl.
*B29C 48/00* (2019.01)
*B29C 65/00* (2006.01)
*B32B 37/08* (2006.01)
*B32B 37/10* (2006.01)
*H01M 4/04* (2006.01)
*H01M 4/133* (2010.01)
*H01M 4/1393* (2010.01)
*B29L 31/34* (2006.01)

(52) U.S. Cl.
CPC ........ *B29C 48/0021* (2019.02); *B29C 66/818* (2013.01); *B29C 66/83423* (2013.01); *B32B 37/08* (2013.01); *B32B 37/1027* (2013.01); *H01M 4/133* (2013.01); *H01M 4/1393* (2013.01); *B29L 2031/3468* (2013.01); *B32B 2457/10* (2013.01)

(58) Field of Classification Search
CPC ....... B29C 48/07; B29C 48/08; B29C 48/286; B29C 48/288; B29C 48/397; B29C 48/501; B29C 48/52; B29C 48/525; B29C 48/68; B29C 48/681; B29C 48/802; B29C 48/832; B29C 66/818; B29C 66/83423; B29L 2031/3468; B32B 37/06; B32B 37/08; B32B 37/1027; B32B 37/20; B32B 2457/10; H01M 4/04; H01M 4/0402; H01M 4/0404; H01M 4/0411; H01M 4/043; H01M 4/0435; H01M 4/0471; H01M 4/13; H01M 4/133; H01M 4/139; H01M 4/1393; H01M 4/366; H01M 4/62; H01M 4/621; H01M 4/622; H01M 4/623; H01M 4/624; H01M 4/625; H01M 4/667; Y02E 60/10

See application file for complete search history.

(56) References Cited

FOREIGN PATENT DOCUMENTS

| | | |
|---|---|---|
| KR | 102081397 B1 | 6/2018 |
| KR | 1020200017821 A | 2/2020 |

* cited by examiner

SYSTEM AND METHOD FOR FABRICATING ELECTRODE FILM FOR SECONDARY BATTERY

CROSS-REFERENCE TO RELATED APPLICATION

This application claims priority to and the benefit of Korean Patent Application No. 10-2021-0094582 filed in the Korean Intellectual Property Office on Jul. 20, 2021, the entire contents of which are incorporated herein by reference.

BACKGROUND

(a) Field of the Disclosure

The present disclosure relates to a system and method for fabricating an electrode film for a secondary battery.

(b) Description of the Related Art

The currently mass-produced secondary battery is generally fabricated by a wet process of preparing the slurry by mixing solvent and powder for electrode material, then applying the slurry to the base material, and drying it.

The wet process may secure excellent dispersion character of electrode material composed of conductive material and binder, and is an easy technology for manufacturing electrodes with uniform thickness.

Meanwhile, as the demand for battery energy density improvement and cost reduction increases, a technology for thickening the electrode is required.

However, in the wet process, when drying using hot air, the binder may float to the electrode surface due to convection.

For this reason, there may be a drawback that the stability of the electrode is lowered as the adherence between the base material and the electrode material is weakened.

To solve this problem, a dry process that may manufacture electrodes without using a solvent is being developed.

In the dry process, the method of squeezing the powder after applying it to the base material, and the method of bonding the powder with the base material after separately filming it are used.

When the powder is filmed separately, securing adherence between the powder film and the base material is an important factor, and R&D is required for this.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

An exemplary system for fabricating an electrode film for a secondary battery may include a powder film fabrication unit configured to form mixture powder with active material powder, binder powder, and conductive material powder, and fabricate a powder film roll by fibrillating the mixture powder, a base material film fabrication unit configured to form a mixture solution with carbon-based powder, the binder powder, and organic solvent, and form a base material film roll by patterning the mixture solution on a base material film, and an electrode film fabrication unit configured to dispose the base material film roll between two powder film rolls, and form an electrode film roll by overlapping and bonding the powder film and the base material film.

The powder film fabrication unit may include an active material powder container, a binder powder container, and a conductive material powder container configured to store the active material powder, the binder powder, and the conductive material powder, respectively, a first tank configured to be supplied with preset amounts of the active material powder, the binder powder, and the conductive material powder from the active material powder container, the binder powder container, and the conductive material powder container and form the mixture powder by a first rotation member, a mixing pipe, connected to the first tank, formed in a lengthy tube shape, configured to be supplied with the mixture powder through a hopper mounted on a frontward upper side, and formed in a taper shape whose rear end portion is smaller in diameter to have an outlet of a slot shape, a second rotation member, installed within the mixing pipe along a length direction, rotated by a second motor to fibrillate the mixture powder and discharge the fibrillated mixture powder in the form of the powder film through the outlet, and formed as a screw whose diameter gradually increases such that a distance to an interior surface of the mixing pipe decreases rearward, and a heating pipe configured to apply heat to the mixture powder inside the mixing pipe while enclosing the exterior surface of the mixing pipe in a certain range.

The base material film fabrication unit may include a carbon-based powder container, a binder powder container, and an organic solvent container configured to store the carbon-based powder, the binder powder, and the organic solvent, respectively, a second tank configured to be supplied with preset amounts of the carbon-based powder, the binder powder, and the organic solvent from the carbon-based powder container, the binder powder container, and the organic solvent container and form the mixture solution by a third rotation member, a manifold pipe supplied with the mixture solution by a pumping apparatus connected to the second tank, at least one nozzle branched from the manifold pipe to discharge the mixture solution, and a second bobbin configured to rewind the base material film that is unwound from a first bobbin and patterned with the mixture solution discharged from the at least one nozzle.

The base material film fabrication unit may further include a high voltage application apparatus configured between the first bobbin and the at least one nozzle, to apply a high voltage to discharge the mixture solution by a predetermined amount through the at least one nozzle.

The base material film fabrication unit may further include a pair of heating rolls disposed between the first bobbin and the second bobbin, and configured to bond the mixture solution patterned on the base material film to the base material film by pressurization and heating.

The electrode film fabrication unit may include a pair of pressurization belts disposed at both sides of the powder film, the base material film, and the powder film and configured to pressurize the powder film, the base material film, and the powder film, a heating device configured to each of the pair of pressurization belts, and configured to heat the powder film, the base material film, and the powder film, for bonding, a cooling device disposed rearward to the heating device, and configured to cool the powder film, the base material film, and the powder film heated by the heating device, and an electrode film bobbin disposed rearward to the cooling device, and configured to form the electrode film roll by winding the electrode film that is sequential bonding of the powder film, the base material film, and the powder film.

The electrode film fabrication unit may include a heating device configured to heat the base material film unwound from the base material film roll, a pair of pressurization belts disposed at both sides of the powder film, the base material film, and the powder film, and configured to pressurize the powder film, the base material film, and the powder film, where the powder film roll is disposed at both sides of the base material film heated by the heating device such that the base material film may be bonded with the powder film at both sides, a cooling device configured to each of the pair of pressurization belts, and configured to cool the powder film, the base material film, and the powder film, and an electrode film bobbin disposed rearward to the cooling device, and configured to form the electrode film roll by winding the electrode film that is sequential bonding of the powder film, the base material film, and the powder film.

An exemplary method for fabricating an electrode for secondary battery may include fabricating a powder film roll by filming a mixture powder of an active material powder, a binder powder, and a conductive material powder, fabricating a base material film roll by patterning a mixture solution of carbon-based powder, the binder powder, and an organic solvent on a base material film, and fabricating an electrode film roll by bonding the powder film and the base material film where the powder film roll is disposed at both sides of the base material film roll.

The fabricating the powder film roll may include forming the mixture powder by inputting preset amounts of the active material powder, the binder powder, and the conductive material powder into a first tank, and by mixing the active material powder, the binder powder, and the conductive material powder by a first rotation member inside the first tank, supplying the mixture powder into a mixing pipe connected to the first tank and formed in a lengthy tube shape, fibrillating the mixture powder by a second rotation member within the mixing pipe, and forming the mixed powder into a mixed powder film while discharging it through the outlet of the mixing tube.

In supplying the mixture powder into the mixing pipe, the mixture powder may be supplied into the mixing pipe through a hopper mounted on a frontal side of the mixing pipe. In fibrillating the mixture powder, the fibrillation occurs while the mixture powder may move from frontward to rearward in the mixing pipe by the second rotation member, whose diameter is larger rearward.

Fibrillating the mixture powder may include heating the mixture powder by a heating pipe enclosing an exterior surface of the mixing pipe.

In the forming the mixed powder into a mixed powder film, the fibrillated mixture powder may be squeezed and discharged in a film shape the outlet formed in a slot shape at a rear end of the mixing pipe that is formed in a taper shape whose rear end portion is smaller in diameter.

The fabricating the base material film roll may include forming the mixture solution by inputting preset amounts of the carbon-based powder, the binder powder, and the organic solvent into a second tank, and by mixing the carbon-based powder, the binder powder, and the organic solvent by a third rotation member inside the second tank, supplying the mixture solution to a manifold pipe connected to the second tank, and patterning the mixture solution on the base material film at preset amount and pattern through a plurality of nozzles mounted on the manifold pipe.

In supplying the mixture solution to a manifold pipe, the mixture solution of the second tank may be supplied to the manifold pipe by a pumping apparatus disposed between the second tank and the manifold pipe.

In patterning the mixture solution on the base material film, the mixture solution supplied from the plurality of nozzles may be patterned on the base material film while unwinding the base material film wound around a first bobbin, and the patterned base material film is re wound around a second bobbin, to form the base material film roll patterned with the mixture solution.

In patterning the mixture solution on the base material film, discharge amount and pattern of the mixture solution discharged from the plurality of nozzles may be controlled while applying a high voltage between the first bobbin and the plurality of nozzles by a high voltage application apparatus connected between the first bobbin and the plurality of nozzles.

Patterning the mixture solution on the base material film may include bonding the mixture solution patterned on the base material film to the base material film by pressurization and heating by a pair of heating rolls disposed between the first bobbin and the second bobbin.

Fabricating the electrode film roll may include stacking the powder film, the base material film, and the powder film, pressurizing and heating a stack of the powder film, the base material film, and the powder film by an electrode film fabrication unit, and winding the stack on an electrode film bobbin to fabricate the electrode film roll.

In pressurizing and heating a stack of the powder film, the base material film, and the powder film, the stack of the powder film, the base material film, and the powder film may be pressurized by a pair of pressurization belts disposed at both sides of the powder film, the base material film, and the powder film, and the stack of the powder film, the base material film, and the powder film may be heated and then cooled by a heating device and a cooling device sequentially disposed to each of the pair of pressurization belts.

The fabricating the electrode film roll may include heating the base material film by the heating device, stacking the powder film, the heated base material film, and the powder film, pressurizing a stack of the powder film, the heated base material film, and the powder film, and cooling the stack of the powder film, the heated base material film, and the powder film by a cooling device.

According to a system and method for fabricating an electrode film for a secondary battery according to an exemplary embodiment, the conductive buffer layer is formed by applying the mixture solution between the base material film and the powder film, adherence may be ensured even if the electrode is thickened, while decreasing resistance, and improving conductivity.

In addition, in a system and method for fabricating an electrode film for a secondary battery according to an exemplary embodiment, adjustment of air gap size of the mixture solution pattern becomes easy by applying the carbon-based powder, and thus, forming the electrode having various particle size may be easily achieved.

Other effects that may be obtained or are predicted by an exemplary embodiment will be explicitly or implicitly described in a detailed description of the present disclosure. That is, various effects that are predicted according to an exemplary embodiment will be described in the following detailed description.

DETAILED DESCRIPTION

Figure 1:
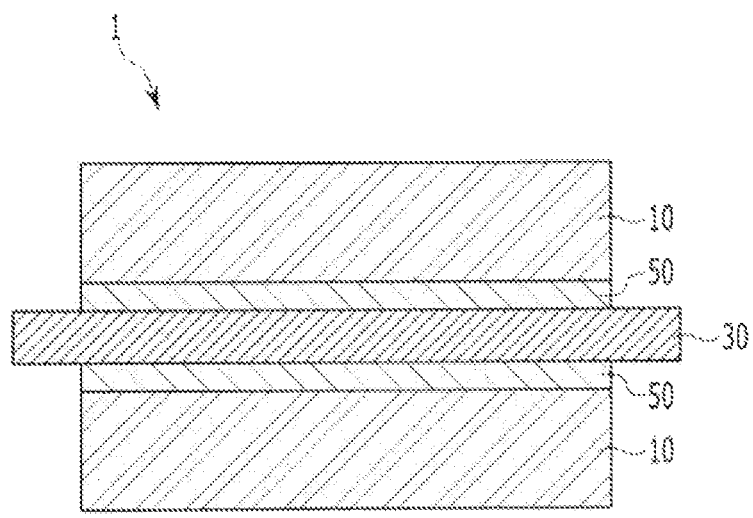
FIG. 1 is a schematic diagram of an electrode fabricated by system and method for fabricating an electrode film for a secondary battery according to an exemplary embodiment.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

In order to clarity the present disclosure, parts that are not related to the description will be omitted, and the same elements or equivalents are referred to with the same reference numerals throughout the specification.

In the following description, dividing names of components into first, second, and the like is to divide the names because the names of the components are the same as each other, and an order thereof is not particularly limited.

FIG. 1 is a schematic diagram of an electrode fabricated by system and method for fabricating an electrode film for a secondary battery according to an exemplary embodiment.

Referring to FIG. 1, an electrode 1 for a secondary battery fabricated by a method for fabricating an electrode film for a secondary battery according to an exemplary embodiment may be either a negative electrode or a positive electrode, which are disposed opposite to each other interposing a separator.

The electrode 1 is formed by bonding a base material film 30 between a pair of powder films 10 by a conductive buffer layer 50.

When the thickening technique for improving energy density is applied to the electrode 1, the loading amount of the electrode 1 that the base material film 30 must endure increases, so strong adherence between the base material film 30 and a powder film 10 is required.

In addition, due to the thickening of the electrode 1, the moving distance of electrons from the base material film 30 to a surface of the powder film 10 increases. Therefore, in order to prevent the output from being decreased, it may be advantageous that the resistance between the base material film 30 and the powder film 10 is lowered.

The pattern of a mixture solution 30d (refer to FIG. 2) applied to both sides of the base material film 30 forms the conductive buffer layer 50, and in an exemplary embodiment, to minimize the decrease in energy density, carbon-based powder is used to form a nano-scale thin film coating.

A system for fabricating the electrode film for such an electrode is as follows.

Figure 2:
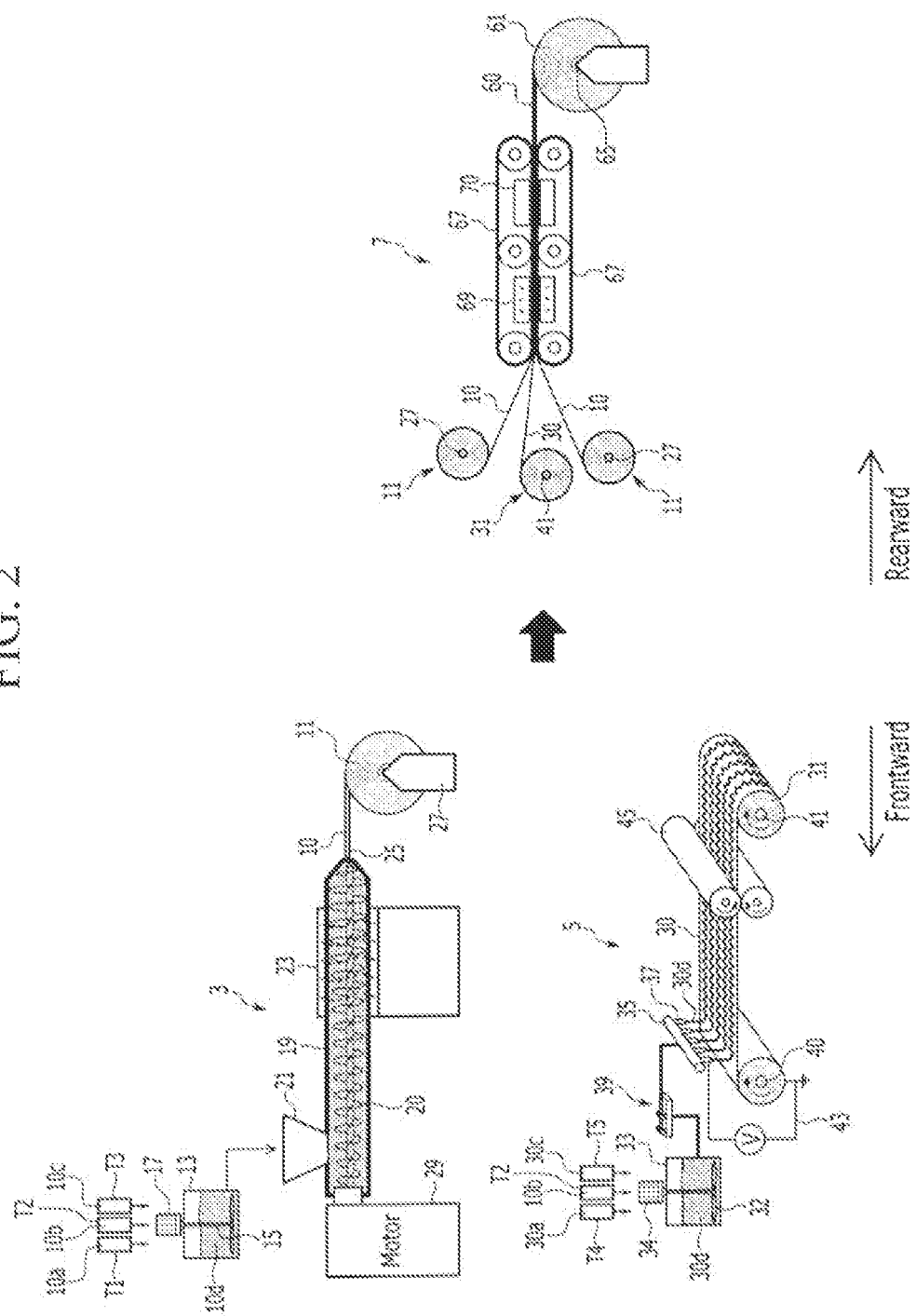
FIG. 2 is a schematic diagram showing an entire system for fabricating an electrode film for a secondary battery according to an exemplary embodiment.
Figure 3:
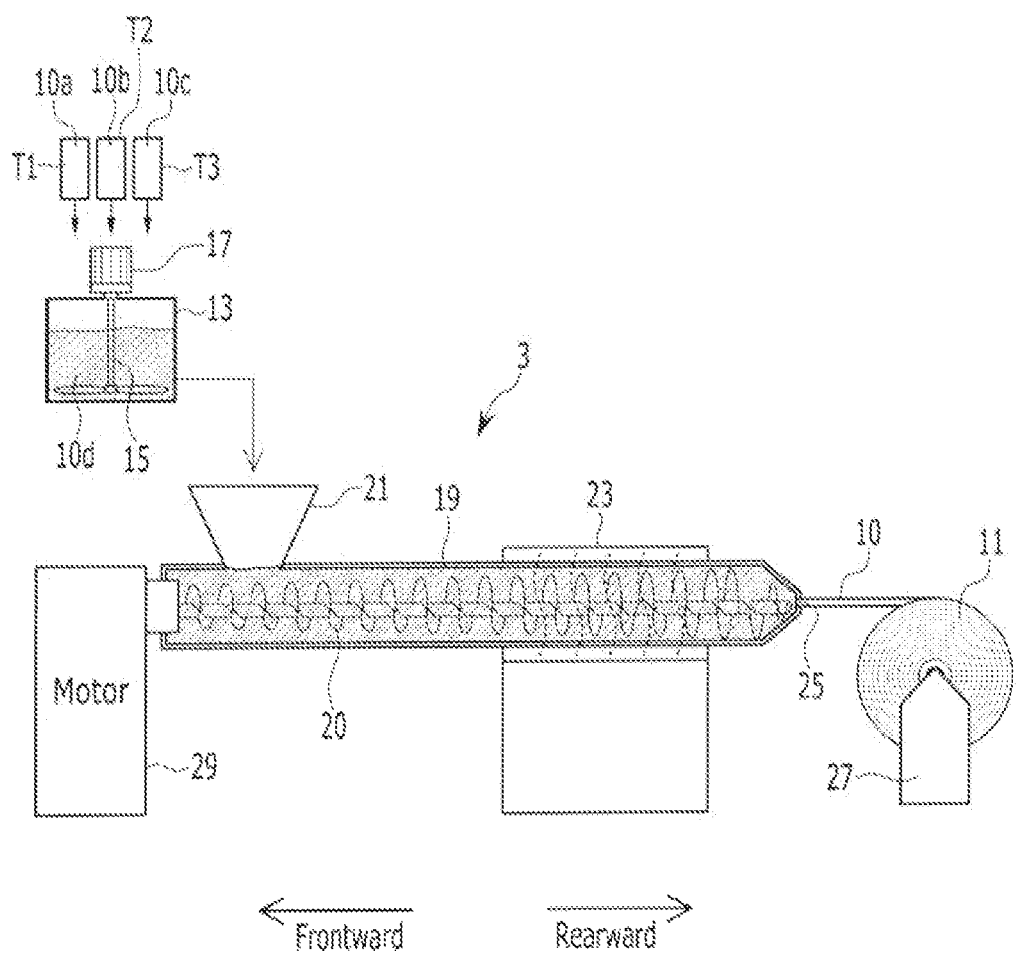
FIG. 3 is a schematic diagram of a powder film fabrication unit applied to a system for fabricating an electrode film for a secondary battery according to an exemplary embodiment.

FIG. 2 is a schematic diagram showing an entire system for fabricating an electrode film for a secondary battery according to an exemplary embodiment, and FIG. 3 is a schematic diagram of a powder film fabrication unit applied to a system for fabricating an electrode film for a secondary battery according to an exemplary embodiment.

Referring to FIG. 2 and FIG. 3, a system for fabricating an electrode film for a secondary battery according to an exemplary embodiment includes a powder film fabrication unit 3, a base material film fabrication unit 5, and an electrode film fabrication unit 7.

In this specification, the terms frontward and rearward are defined with reference to a traveling direction of the films until an electrode film roll 61 is made.

That is, the powder film fabrication unit 3 and the base material film fabrication unit 5 may be positioned frontward, and the electrode film fabrication unit 7 may be disposed rearward.

The powder film fabrication unit 3 is configured to form mixture powder 10d with active material powder 10a, binder powder 10b, and conductive material powder 10c, and fabricate a powder film roll 11 by fibrillating the mixture powder 10d.

The powder film fabrication unit 3 includes an active material powder container T1, a binder powder container T2, a conductive material powder container T3, a first tank 13, a mixing pipe 19, a second rotation member 20, and a heating pipe 23.

The active material powder container T1, the binder powder container T2, and the conductive material powder container T3 are configured to store the active material powder 10a, the binder powder 10b, and the conductive material powder 10c, respectively.

The first tank 13 is supplied with preset amounts of the active material powder 10a, the binder powder 10b, and the conductive material powder 10c from the active material powder container T1, the binder powder container T2, and the conductive material powder container T3, respectively.

The preset amounts of the active material powder 10a, the binder powder 10b, and the conductive material powder 10c are mixed in the first tank 13 to form the mixture powder 10d.

A first rotation member 15 is configured in the first tank 13.

The first rotation member 15 may be operated by a first motor 17.

Inside the first tank 13, the mixture powder 10d is formed by the agitation of the first rotation member 15.

The first tank 13 is connected to the mixing pipe 19.

The mixing pipe 19 is formed in a lengthy tube shape, and configured to be supplied with the mixture powder 10d through a hopper 21 mounted on a frontward upper side.

The mixing pipe 19 is formed in a taper shape whose rear end portion is smaller in diameter to have an outlet 25 of a slot shape.

The second rotation member 20 is configured in the mixing pipe 19.

The second rotation member 20 is installed lengthy within the mixing pipe 19 along a length direction.

The second rotation member 20 is rotated by a second motor 29, to fibrillate the mixture powder 10d and discharge the fibrillated mixture powder 10d in the form of the powder film 10 through the outlet 25.

The second rotation member 20 may be formed as a screw whose diameter gradually increases such that a distance to an interior surface of the mixing pipe 19 decreases rearward.

That is, the mixture powder 10d is supplied to a front of the mixing pipe 19 and moves rearward by the second rotation member 20.

In addition, the distance between the second rotation member 20 and the mixing pipe 19 gradually decreases as it moves rearward, and the friction applied to the mixture powder 10*d* within the mixing pipe 19 moving rearward also increases.

In addition, the heating pipe 23 is configured rearward to the mixing pipe 19.

The heating pipe 23 is configured to apply heat to the mixture powder 10*d* inside the mixing pipe 19 while enclosing the exterior surface of the mixing pipe 19 in a certain range.

The powder film 10 discharged from the mixing pipe 19 may be wound around the powder film bobbin 27 to form the powder film roll 11.

Figure 4:
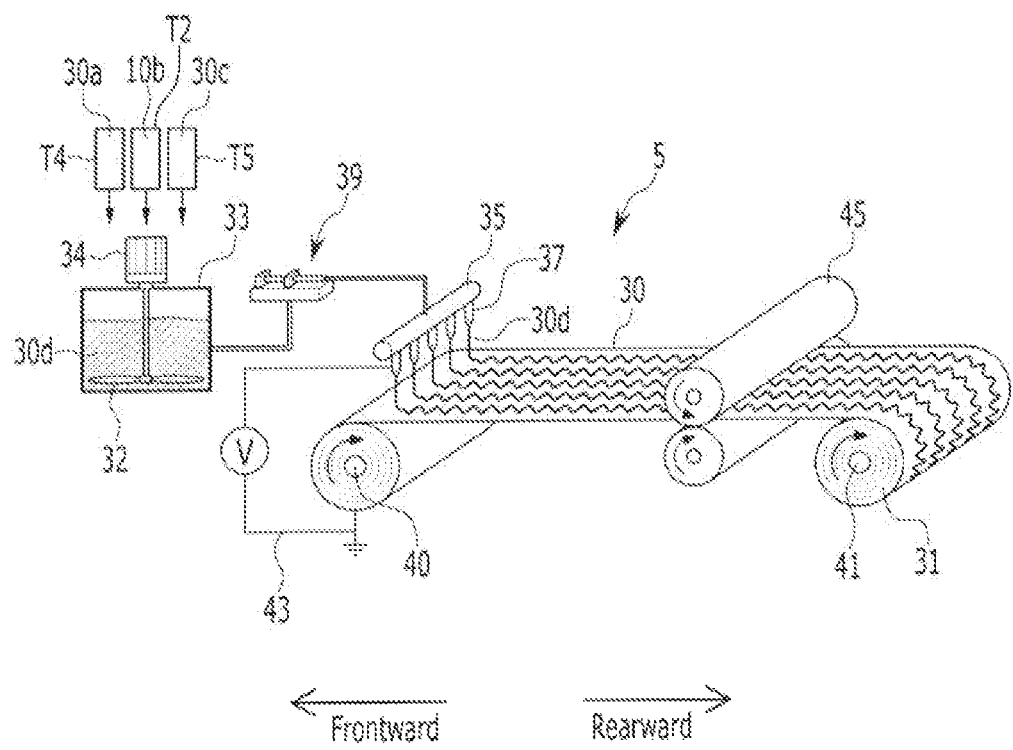
FIG. 4 is a schematic diagram of a base material film fabrication unit applied to a system for fabricating an electrode film for a secondary battery according to an exemplary embodiment.

FIG. 4 is a schematic diagram of a base material film fabrication unit applied to a system for fabricating an electrode film for a secondary battery according to an exemplary embodiment.

Referring to FIG. 4, in an exemplary embodiment, the base material film fabrication unit 5 is configured to form the mixture solution 30*d* with carbon-based powder 30*a*, the binder powder 10*b*, and organic solvent 30*c*, and form a base material film roll 31 by patterning the mixture solution 30*d* on the base material film 30.

The base material film fabrication unit 5 includes a carbon-based powder container T4, the binder powder container T2, an organic solvent container T5, a second tank 33, a manifold pipe 35, at least one nozzle 37, a first bobbin 40, a second bobbin 41, a high voltage application apparatus 43, and a pair of heating rolls 45.

The carbon-based powder container T4, the binder powder container T2, and the organic solvent container T5 store the carbon-based powder 30*a*, the binder powder 10*b*, and the organic solvent 30*c*, respectively.

The second tank 33 is supplied with preset amounts of the carbon-based powder 30*a*, the binder powder 10*b*, and the organic solvent 30*c* from the carbon-based powder container T4, the binder powder container T2, and the organic solvent container T5, respectively.

The preset amounts of the carbon-based powder 30*a*, the binder powder 10*b*, and the organic solvent 30*c* are mixed in the second tank 33 to form the mixture solution 30*d*.

A third rotation member 32 is configured in the second tank 33.

The third rotation member 32 is rotatable by a third motor 34.

That is, inside the second tank 33, the mixture solution 30*d* is formed by the third rotation member 32.

The manifold pipe 35 is connected to the second tank 33.

A pumping apparatus 39 is configured between the second tank 33 and the manifold pipe 35.

The pumping apparatus 39 is configured to supply the mixture solution 30*d* from the second tank 33 to the manifold pipe 35.

The at least one nozzle 37 is connected to the manifold pipe 35.

The at least one nozzle 37 is branched from the manifold pipe 35 to discharge the mixture solution 30*d*.

In addition, the first bobbin 40 and the second bobbin 41 are configured below the at least one nozzle 37.

The first bobbin 40 is wound with the base material film 30 that is not processed yet.

The base material film 30 is unwound from the first bobbin 40 and rewound around the second bobbin 41, during which the mixture solution 30*d* discharged from the at least one nozzle 37 is patterned on the base material film 30.

At this time, the high voltage application apparatus 43 is configured between the first bobbin 40 and the at least one nozzle 37.

The high voltage application apparatus 43 is configured to apply a high voltage to the first bobbin 40 and the at least one nozzle 37 to discharge the mixture solution 30*d* by a predetermined amount through the at least one nozzle 37.

In addition, the pair of heating rolls 45 are configured between the first bobbin 40 and the second bobbin 41.

The pair of heating rolls 45 is configured to bond the mixture solution 30*d* patterned on the base material film 30 to the base material film 30 by pressurization and heating.

The base material film roll 31 may be formed by the base material film 30 bonded with the patterned mixture solution 30*d* by the pair of heating rolls 45.

Figure 5:
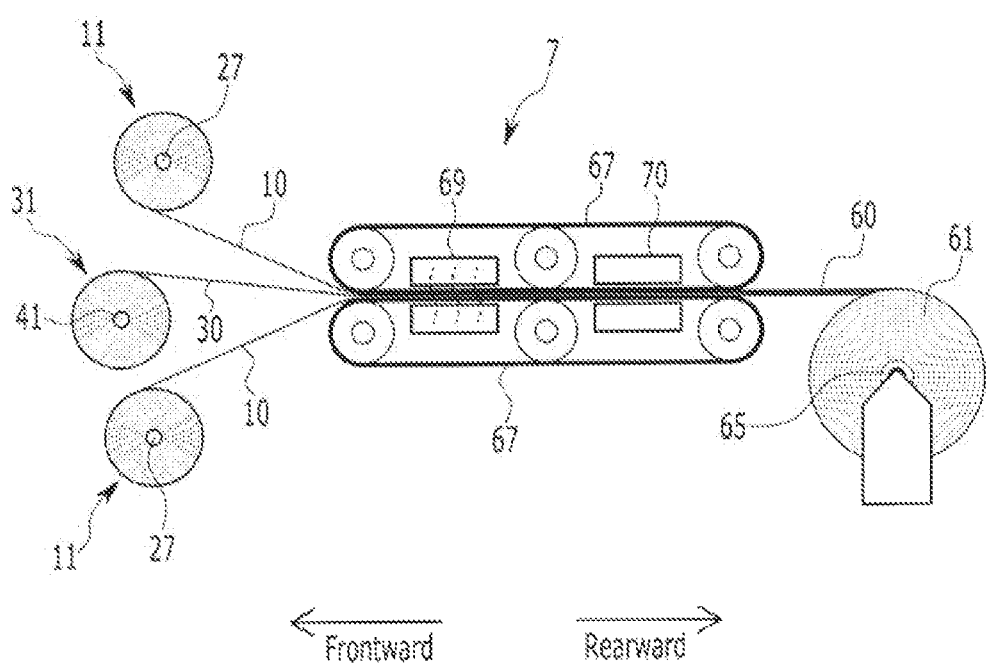
FIG. 5 and FIG. 6 each show a schematic diagram of an electrode film fabrication unit applied to a system for fabricating an electrode film for a secondary battery according to an exemplary embodiment.
Figure 6:
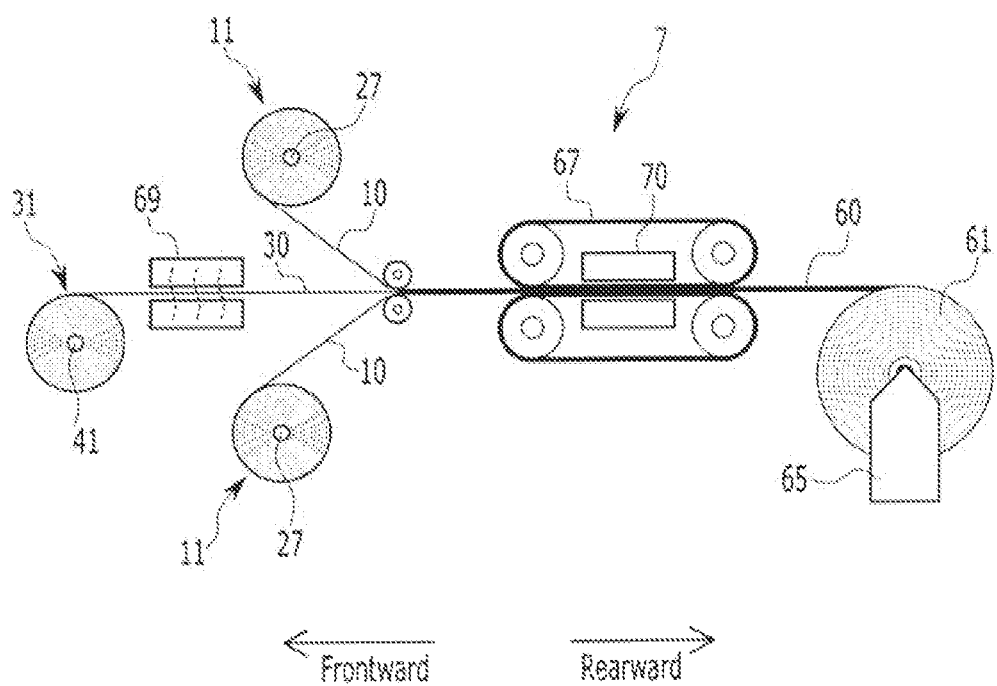

FIG. 5 and FIG. 6 each show a schematic diagram of an electrode film fabrication unit applied to a system for fabricating an electrode film for a secondary battery according to an exemplary embodiment.

The electrode film fabrication unit 7 is configured to dispose the base material film roll 31 between two powder film rolls 11, and form the electrode film roll 61 by overlapping and bonding the powder film 10 and the base material film 30.

Referring to FIG. 5, the electrode film fabrication unit 7 includes a pair of pressurization belts 67 disposed at both sides of the powder film 10, the base material film 30, and the powder film 10.

The pair of pressurization belts 67 is configured to pressurize the powder film 10, the base material film 30, and the powder film 10 that are overlapped.

A heating device 69 is configured to each of the pair of pressurization belts 67.

The powder film roll 11 and the base material film roll 31 are disposed such that the powder film 10, the base material film 30, and the powder film 10 overlap, and the heating device 69 is configured to heat the powder film 10, the base material film 30, and the powder film 10, for bonding.

A cooling device 70 is disposed rearward to the heating device 69.

The cooling device 70 is configured to each of the pair of pressurization belts 67.

The cooling device 70 is configured to cool the powder film 10, the base material film 30, and the powder film 10 heated by the heating device 69.

An electrode film bobbin 65 is configured rearward to the cooling device 70.

The electrode film bobbin 65 is configured to form the electrode film roll 61 by winding an electrode film 60 that is sequential bonding of the powder film 10, the base material film 30, and the powder film 10.

In addition, the electrode film fabrication unit 7 may have the following structure.

Referring to FIG. 6, the electrode film fabrication unit 7 includes a heating device 69 configured to heat the base material film 30 unwound from the base material film roll 31.

The powder film roll 11 is disposed at both sides of the base material film 30 heated by the heating device 69 such that the base material film 30 may be bonded with the powder film 10 at both sides, and the pair of pressurization belts 67 are disposed at both sides of the powder film 10, the base material film 30, and the powder film 10.

The pair of pressurization belts 67 is configured to pressurize the powder film 10, the base material film 30, and the powder film 10.

The cooling device 70 is configured to cool each of the pair of pressurization belts 67.

The cooling device 70 is configured to cool the powder film 10, the base material film 30, and the powder film 10.

The electrode film bobbin 65 is configured rearward to the cooling device 70.

The electrode film bobbin 65 is configured to form the electrode film roll 61 by winding the electrode film 60 that is sequential bonding of the powder film 10, the base material film 30, and the powder film 10.

A method for fabricating an electrode film for a secondary battery by using the above-described system for fabricating an electrode film for a secondary battery is as follows.

Figure 7:
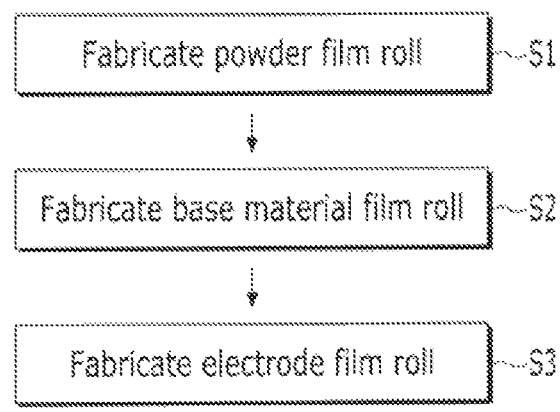
FIG. 7 is a flowchart showing a method for fabricating an electrode film for a secondary battery according to an exemplary embodiment.

FIG. 7 is a flowchart showing a method for fabricating an electrode film for a secondary battery according to an exemplary embodiment.

Referring to FIG. 7, a method for fabricating an electrode film for a secondary battery according to an exemplary embodiment may include, a first step S1 of fabricating the powder film roll 11, a second step S2 of fabricating the base material film roll 31, and a third step S3 of fabricating the electrode film roll 61 by bonding the powder film roll 11 and the base material film roll 31.

The fabricating of the powder film roll 11 may be as follows (also refer to description related to FIG. 3).

First, preset amounts of the active material powder 10a, the binder powder 10b, and the conductive material powder 10c are input into the first tank 13.

The amount and type of the active material powder 10a, the binder powder 10b, and the conductive material powder 10c may be set according to the type of the electrode 1 to be fabricated.

The mixture powder 10d is formed by mixing the active material powder 10a, the binder powder 10b, and the conductive material powder 10c by the first rotation member 15 inside the first tank 13.

The first rotation member 15 may be configured to rotate inside the first tank 13 by the first motor 17.

The mixing pipe 19 is disposed adjacent to the first tank 13.

The mixing pipe 19 is formed in a lengthy tube shape.

The mixing pipe 19 is connected to the first tank 13, and the mixture powder 10d is supplied from the first tank 13.

The second rotation member 20 is configured inside the mixing pipe 19.

The second rotation member 20 may be formed lengthy along the mixing pipe 19, within the mixing pipe 19.

The second rotation member 20 may be rotated by the second motor 29 disposed frontward to the mixing pipe 19.

The second rotation member 20 fibrillates the mixture powder 10d supplied into the mixing pipe 19.

The mixture powder 10d may be supplied into the mixing pipe 19 through the hopper 21 mounted on a frontal side of the mixing pipe 19.

When the mixture powder 10d is supplied into the mixing pipe 19, fibrillation of the mixture powder 10d is made by the second rotation member 20 installed within the mixing pipe 19.

The second rotation member 20 within the mixing pipe 19 has a larger diameter rearward, and the fibrillation occurs as the mixture powder 10d moves rearward within the mixing pipe 19.

In other words, the distance between the mixing pipe 19 and the second rotation member 20 becomes narrower toward the rearward of the mixing pipe 19.

The mixed powder 10d is moved from the front to the rear of the mixing pipe 19 by the rotation of the second rotating body 20, and mixed by a gap that becomes narrower toward the rear of the mixing pipe 19, by which the binding force between the powders 10d increases, thereby causing fibrillation.

In addition, the heating pipe 23 is disposed at a rear portion of the mixing pipe 19.

The heating pipe 23 encloses the exterior surface of the mixing pipe 19, and may apply heat to the mixture powder 10d moving inside the mixing pipe 19.

The mixture powder 10d, preheated by the heating pipe 23, has improved ductility and is easily formed into a film.

In addition, the mixture powder 10d is made into a film while discharging through the outlet 25 of the mixing pipe 19.

At this time, the mixing pipe 19 is formed in a taper shape whose rear end portion is smaller in diameter, and the outlet 25 in a slot shape is formed at a rear end.

Fibrillation occurs as the mixture powder 10d passes through the mixing pipe 19, and the fibrillated mixture powder 10d is squeezed and discharged in a film shape through the outlet 25.

The mixture powder 10d formed into a film is wound around the powder film bobbin 27 to complete the powder film roll 11.

Then, the base material film roll 31 is fabricated by patterning the mixture solution 30d of the carbon-based powder 30a, the binder powder 10b, and the organic solvent 30c on the base material film 30 (also refer to FIG. 4).

First, preset amounts of the carbon-based powder 30a, the binder powder 10b, and the organic solvent 30c are input into the second tank 33.

The amount and type of the carbon-based powder 30a, the binder powder 10b, and the organic solvent 30c may be set according to the type of the electrode 1 to be fabricated.

The mixture solution 30d is formed by mixing the carbon-based powder 30a, the binder powder 10b, and the organic solvent 30c by the third rotation member 32 inside the second tank 33.

The third rotation member 32 may be rotated by the third motor 34 inside the second tank 33.

The manifold pipe 35 is connected to the second tank 33.

The mixture solution 30d is supplied to the manifold pipe 35.

The mixture solution 30d of the second tank 33 may be supplied to the manifold pipe 35 at a preset flow rate and flow speed by the pumping apparatus 39 configured between the second tank 33 and the manifold pipe 35.

For example, the pumping apparatus 39 may include a syringe pump.

Then, the mixture solution 30d is patterned on the base material film 30 at a preset amount and preset pattern by the plurality of nozzles 37 mounted on the manifold pipe 35.

The manifold pipe 35 supplies the mixture solution 30d to the plurality of nozzles 37 at a same flow rate.

That is, while unwinding the base material film 30 wound around the first bobbin 40, the mixture solution 30d supplied from the plurality of nozzles 37 is patterned on the base material film 30, and then the patterned base material film 30 is re wound around the second bobbin 41, to form the base material film roll 31 patterned with the mixture solution 30d.

The high voltage application apparatus 43 is connected between the first bobbin 40 and the plurality of nozzles 37.

A high voltage is applied between the first bobbin 40 and the at least one nozzle 37 by the high voltage application apparatus 43.

Accordingly, discharge amount and pattern of the mixture solution 30d discharged from the at least one nozzles 37 may be controlled while applying the high voltage between the first bobbin 40 and the at least one nozzle 37 by the high voltage application apparatus 43.

Before the high voltage is applied between the first bobbin 40 and the at least one nozzle 37, the mixture solution 30d is formed in the form of a spherical bubble at the at least one nozzle 37, and when the high voltage is applied, the mixture solution 30d becomes positively charged, and the solution state changes to the form of a taylor cone after overcoming the surface tension.

At this time, as the carbon fiber in the carbon-based powder 30a is spun, the carbon fiber may be patterned on the base material film 30 with a preset pattern.

The organic solvent 30c is vaporized.

In addition, through the pair of heating rolls 45 disposed between the first bobbin 40 and the second bobbin 41, the mixture solution 30d patterned on the base material film 30 is bonded to the base material film 30 by pressurization and heating.

As described above, the mixture solution 30d formed on the base material film 30 is formed as the conductive buffer layer 50 (refer to FIG. 1).

Subsequently, the electrode film roll 61 is fabricated by disposing the powder film roll 11 at both sides of the base material film roll 31 and by bonding the powder film 10 and the base material film 30 (also refer to FIG. 5 and FIG. 6).

First, the powder film 10, the base material film 30, and the powder film 10 are stacked in this order.

The stack of the powder film 10, the base material film 30, and the powder film 10 is pressurized and heated by the electrode film fabrication unit 7, and then wound around the electrode film bobbin 65 to fabricate the electrode film roll 61.

The stack of the powder film 10, the base material film 30, and the powder film 10 are pressurized by the pair of pressurization belts 67 disposed at both sides of the powder film 10, the base material film 30, and the powder film 10. In addition, the heating device 69 and the cooling device 70 are sequentially disposed to each of the pair of pressurization belts 67, and the stack of the powder film 10, the base material film 30, and the powder film 10 is heated by the heating device 69 and then cooled by the cooling device 70.

At this time, a surface of the base material film 30 is slightly melted by the heating device 69 to form adherence to be bonded with the powder film 10, and the bonding is completed by cooling by the cooling device 70.

Alternatively, the electrode film roll 61 may be fabricated, the base material film 30 may be heated by the heating device 69 prior to be stacked with the powder film 10 (refer to FIG. 6).

With the heated base material film 30 interposed between the powder film 10, the powder film 10, the heated base material film 30, and the powder film 10 are stacked and the stack is pressurized through the pair of pressurization belts 67.

In addition, the bonding is completed to form the electrode film by cooling the stack of the powder film 10, the heated base material film 30, and the powder film 10 by the cooling device 70, e.g., configured to each of the pressurization belts 67.

Finally, the electrode film 60 is wound around the electrode film roll 61 formed as described above, and the electrode film 60 wound around the electrode film roll 61 may be cut to a preset size to form the electrode 1.

Therefore, according to a system and method for fabricating an electrode film for a secondary battery according to an exemplary embodiment, when the mixture solution 30d is applied, the solvent may be vaporized by using the high voltage application apparatus 43, and therefore, a drying furnace in a conventional wet coating may be removed, thereby simplifying an equipment layout, and reducing an energy cost for operating the drying furnace.

In addition, according to a system and method for fabricating an electrode film for a secondary battery according to an exemplary embodiment, the conductive buffer layer 50 is formed by applying the mixture solution 30d between the base material film 30 and the powder film 10, adherence may be ensured even if the electrode 1 is thickened, while decreasing resistance, and improving conductivity.

In addition, according to a system and method for fabricating an electrode film for a secondary battery according to an exemplary embodiment, adjustment of air gap size of the mixture solution 30d pattern becomes easy by applying the carbon-based powder 30a, and thus, forming the electrode 1 having various particle size may be easily achieved.

As a result, the manufacturing method of the electrode 1 for the secondary battery may minimize the energy density reduction effect by patterning the mixture solution 30d.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A method for fabricating an electrode for a secondary battery, the method comprising:
    fabricating a powder film roll by filming a mixture powder of an active material powder, a binder powder, and a conductive material powder;
    fabricating a base material film roll by patterning a mixture solution of carbon-based powder, the binder powder, and an organic solvent on a base material film; and
    fabricating an electrode film roll by bonding the powder film and the base material film wherein the powder film is disposed at both sides of the base material film.

2. The method of claim 1, wherein the fabricating the powder film roll comprises:
    forming the mixture powder by inputting preset amounts of the active material powder, the binder powder, and the conductive material powder into a first tank, and by mixing the active material powder, the binder powder, and the conductive material powder by a first rotation member inside the first tank;
    supplying the mixture powder into a mixing pipe connected to the first tank and formed in a lengthy tube shape;
    fibrillating the mixture powder by a second rotation member within the mixing pipe; and
    forming the mixed powder into a mixed powder film while discharging it through an outlet of the mixing pipe.

3. The method of claim 2, wherein:
    in the supplying the mixture powder into the mixing pipe, the mixture powder is supplied into the mixing pipe through a hopper mounted on a frontal side of the mixing pipe; and
    in the fibrillating the mixture powder, the fibrillation occurs while the mixture powder moves from frontward to rearward in the mixing pipe by the second rotation member, the second rotation member having a diameter which is larger rearward.

4. The method of claim 2, wherein the fibrillating the mixture powder comprises:
heating the mixture powder by a heating pipe enclosing an exterior surface of the mixing pipe.

5. The method of claim 2, wherein, in the forming the mixed powder into a mixed powder film, the fibrillated mixture powder is squeezed and discharged in a film shape through the outlet, the outlet having a slot shape, at a rear end of the mixing pipe, the mixing pipe having a taper shape whose rear end portion is smaller in diameter.

6. The method of claim 1, wherein the fabricating the base material film roll comprises:
forming the mixture solution by inputting preset amounts of the carbon-based powder, the binder powder, and the organic solvent into a second tank, and by mixing the carbon-based powder, the binder powder, and the organic solvent by a third rotation member inside the second tank;
supplying the mixture solution to a manifold pipe connected to the second tank; and
patterning the mixture solution on the base material film at a preset amount and pattern through a plurality of nozzles mounted on the manifold pipe.

7. The method of claim 6, wherein, in the supplying the mixture solution to a manifold pipe, the mixture solution of the second tank is supplied to the manifold pipe by a pumping apparatus disposed between the second tank and the manifold pipe.

8. The method of claim 6, wherein, in the patterning the mixture solution on the base material film, the mixture solution supplied from the plurality of nozzles is patterned on the base material film while unwinding the base material film wound around a first bobbin, and the patterned base material film is rewound around a second bobbin, to form the base material film roll patterned with the mixture solution.

9. The method of claim 8, wherein, in the patterning the mixture solution on the base material film, a discharge amount and pattern of the mixture solution discharged from the plurality of nozzles is controlled while applying a high voltage between the first bobbin and the plurality of nozzles by a high voltage application apparatus connected between the first bobbin and the plurality of nozzles.

10. The method of claim 8, further comprising bonding the mixture solution patterned on the base material film to the base material film by pressurization and heating by a pair of heating rolls disposed between the first bobbin and the second bobbin.

11. The method of claim 1, wherein the fabricating the electrode film roll comprises stacking the powder film, the base material film, and the powder film;
pressurizing and heating a stack of the powder film, the base material film, and the powder film by an electrode film fabrication unit; and
winding the stack on an electrode film bobbin to fabricate the electrode film roll.

12. The method of claim 11, wherein in the pressurizing and heating a stack of the powder film, the base material film, and the powder film,
the stack of the powder film, the base material film, and the powder film is pressurized by a pair of pressurization belts disposed at both sides of the powder film, the base material film, and the powder film; and
the stack of the powder film, the base material film, and the powder film is heated and then cooled by a heating device and a cooling device sequentially disposed adjacent to each of the pair of pressurization belts.

13. The method of claim 11, wherein the fabricating the electrode film roll comprises:
heating the base material film by a heating device;
stacking the powder film, the heated base material film, and the powder film;
pressurizing a stack of the powder film, the heated base material film, and the powder film; and
cooling the stack of the powder film, the heated base material film, and the powder film by a cooling device.

* * * * *